United States Patent [19]

Harrison et al.

[11] Patent Number: 4,509,567
[45] Date of Patent: Apr. 9, 1985

[54] OIL FILTER AND CAP

[75] Inventors: Bobby J. Harrison, Ortonville; Peter Ashurkoff, Grand Blanc, both of Mich.

[73] Assignee: General Motors Corporation, Detroit, Mich.

[21] Appl. No.: 490,477

[22] Filed: May 2, 1983

[51] Int. Cl.³ .............................................. B65B 3/04
[52] U.S. Cl. ...................................... 141/97; 141/98; 141/326; 141/392; 184/88 R; 220/86 R; 280/770; 296/1 C
[58] Field of Search ................. 141/326, 97, 390, 392, 141/98; 280/770; 296/1 C; 232/41 R, 41 D, 43, 44, 47; 220/86 R; 229/17 B; 184/88 R, 90, 91

[56] References Cited

U.S. PATENT DOCUMENTS

| | | |
|---|---|---|
| 1,574,639 | 2/1926 | Thamm . |
| 2,034,134 | 3/1936 | Eberhard . |
| 2,130,085 | 9/1938 | Harks . |
| 2,724,378 | 11/1955 | Wellman . |
| 3,992,051 | 11/1976 | Hitch ................... 141/390 |

Primary Examiner—Houston S. Bell, Jr.
Attorney, Agent, or Firm—Robert J. Outland

[57] ABSTRACT

An oil filler and closure mounted, in a preferred embodiment, on an engine valve cover provides a hinged cap carrying a pouring trough which, in the open position of the cap, prevents oil spillage on the hinge by carrying poured or dripped oil over the hinge and sealing surface to a position above the filler opening for draining thereinto. When the cap is closed, the pouring trough passes through the filler opening and is stored within the oil containing compartment. A resilient seal, a spring latch, and other features are also disclosed.

5 Claims, 5 Drawing Figures

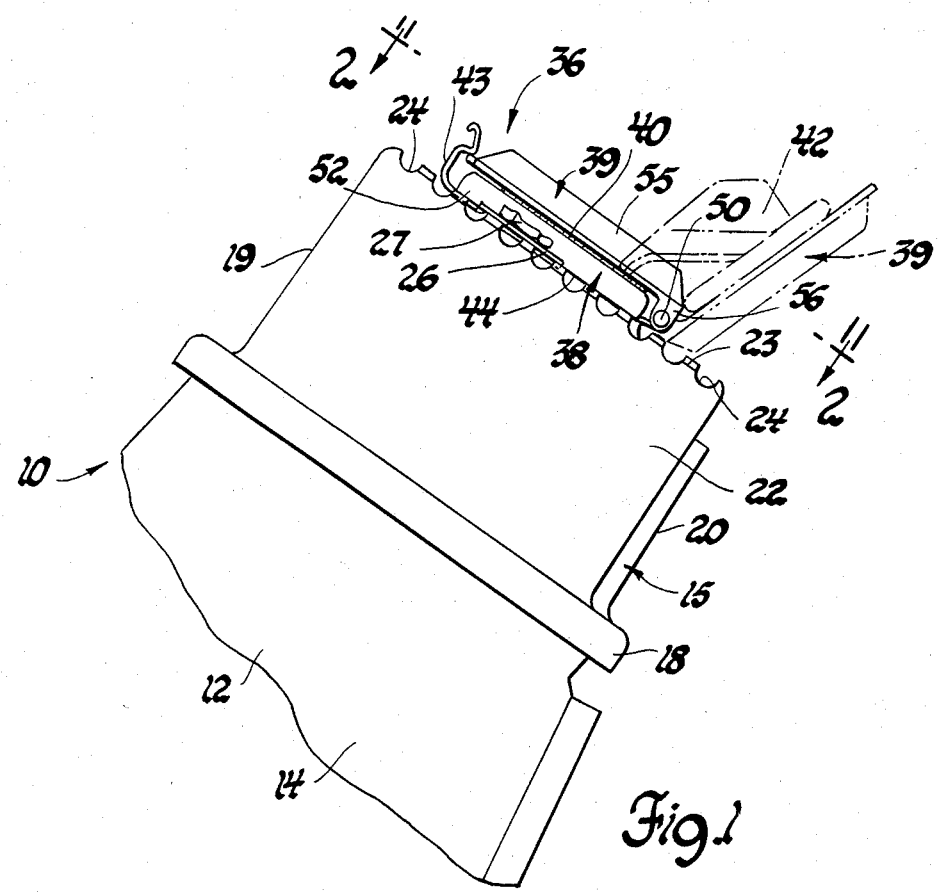
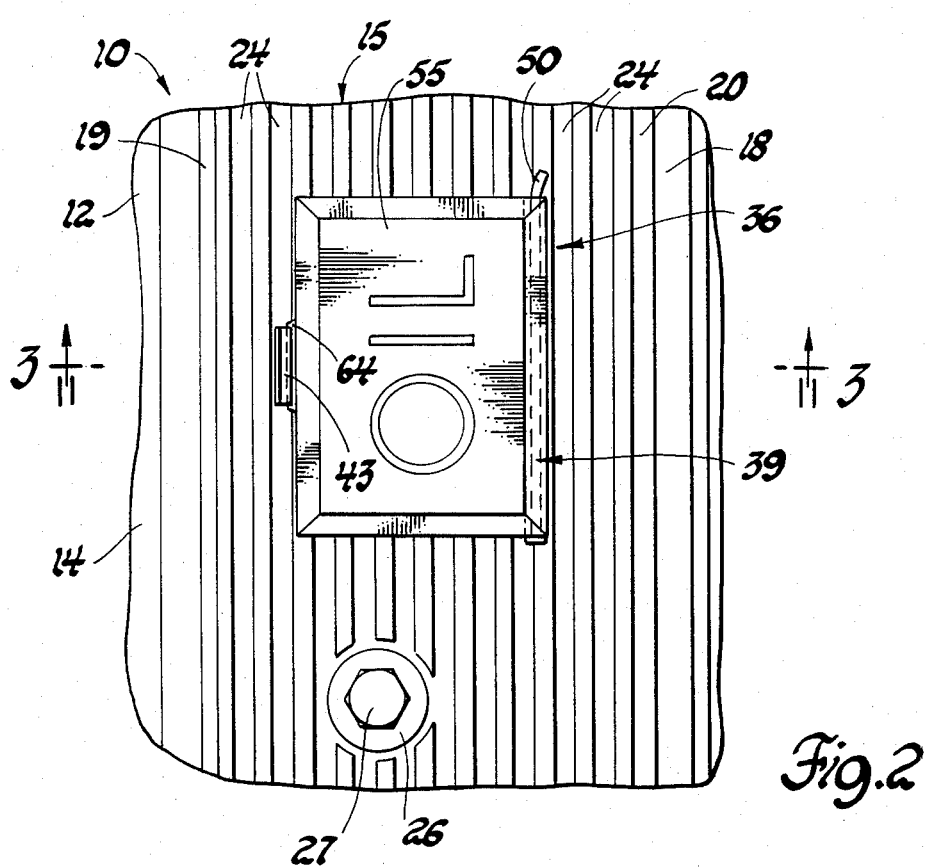

OIL FILTER AND CAP

TECHNICAL FIELD

This invention relates to filler openings and closures therefor for liquid containers. In a particular aspect, the invention relates to oil fillers and closures or caps therefor for lubricating oil systems. More particularly, the invention relates to oil filler openings and closures for the lubricant systems of internal combustion engines and the like.

BACKGROUND

Various types of lubricating oil filler openings and caps have in the past been provided for liquid containers such as, for example, those found in lubricating oil systems of internal combustion engines. Such filler devices have been provided in various locations such as on the ends of projecting tubes leading to the interior of an oil containing portion of an engine or directly on a wall of a lubricant containing chamber, such as the top of a valve cover.

Generally on automotive vehicle engines, the associated caps are made removable. However, various arrangements have been proposed in the past for utilizing caps attached by hinges or retained by other means which prevent their being removed from the engine and accidently misplaced during oil filling operations. Offsetting this advantage of hinged caps are various problems which may include higher cost, inadequate sealing and interference with the addition of lubricant. Moreover, since the cap and hinge structure are retained adjacent the filler opening when oil is being added, the possibility exists that oil will be spilled on the inner side of the cap and in the hinge area. This can cause a more difficult clean-up problem than if the cap were completely removed, leading, in some cases, to the presence of unsightly oil dripping and residue on the surface surrounding the oil filler and cap.

SUMMARY OF THE INVENTION

The present invention provides a novel design of liquid filler and hinged closure (cap) means for a liquid container and especially for use as an oil filler of an internal combustion engine or the like.

A prime feature of the invention is that the cap is provided with an oil drip catching pouring trough, which may also be called a pouring guide or funnel. The pouring trough extends from the interior surface of the cap positioned, when the cap is open, to carry oil spills or drips upon the cap inner surface into the oil filler opening. Further, the pouring trough is configured to pass through the filler opening and be stored within the lubricant container when the cap is closed.

Among additional features of the invention are that the cap is simply made from a small number of elements capable of being formed with a minimum of cost, that the filler and cap arrangement are provided with an effective seal which also provides a pop-open effect when the cap retainer is released, that a simple and inexpensive retaining latch is provided and that the arrangement may be integrated in a simple assembly that is easily attached to an engine valve cover or other lubricant container of suitable design and construction.

BRIEF DRAWING DESCRIPTION

In the drawings:

FIG. 1 is a fragmentary end view of one bank of a V-type internal combustion engine having a valve cover incorporating oil filler and closure means in accordance with the invention;

FIG. 2 is a top view of the rocker cover of the engine as seen from the plane of the line 2—2 of FIG. 1;

DETAILED DESCRIPTION

Figure 3:
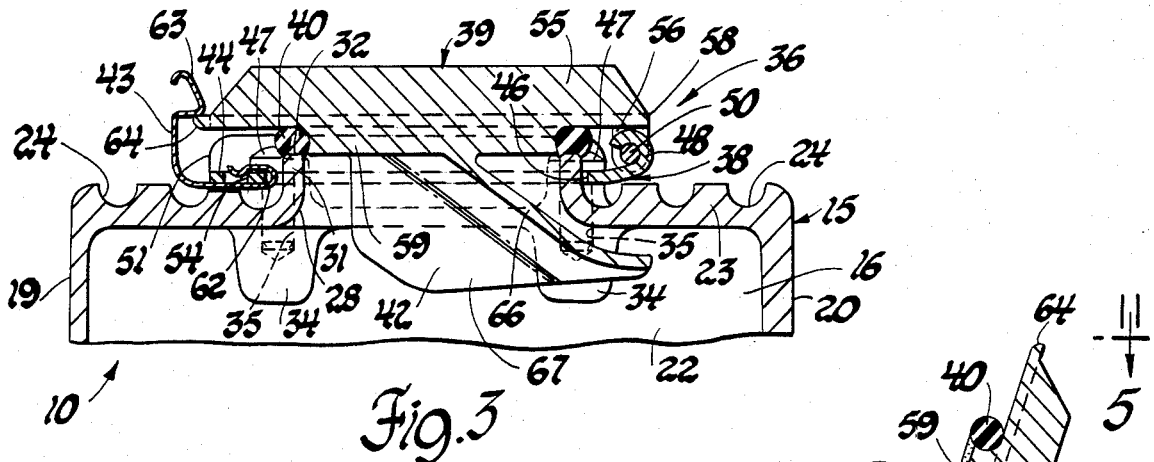
FIG. 3 is an enlarged cross-sectional view through the filler and closure means from the plane of the line 3—3 of FIG. 2.

Referring now to the drawings in detail, numeral 10 generally indicates a V-type multicylinder internal combustion engine representative of the many types of engines and other lubricant containers on which the liquid filler and closure means of the present invention could be applied. Engine 10 includes a cylinder block, not shown, having a pair of cylinder banks only one of which 12 is shown. The cylinder banks extend upwardly at substantial angles with one another from a common crankshaft, not shown, so that, in the most common mounting positions of the engine, the cylinder bank 12 is at a substantial angle from the vertical plane. However, the engine may be mounted with one of its cylinder banks vertical, if desired, as long as the associated lubricant system is arranged to provide for proper oil flow and storage under the desired mounting condition.

The outer end of the cylinder bank 12 is defined by a cylinder head 14 which is fixedly mounted on the cylinder block, closing the ends of the cylinders in its respective bank. A valve cover, or rocker cover 15, is mounted on the top of the cylinder head and encloses valve actuating mechanism including rocker arms, not shown, which are lubricated by engine lubricating oil. Thus the cylinder head and valve cover comprise an oil container defining an oil containing compartment 16 to which lubricating oil is delivered in operation of the engine and from which it is returned by suitable drain means, not shown, to an oil storage means such as an oil pan, not shown, mounted on the lower end of the engine cylinder block.

The valve cover 15 may be made of any suitable material and formed by any means appropriate for the construction of engine valve covers. In the present instance, the valve cover is preferably die cast of lightweight metal, such as magnesium or aluminum, to form a cover having a seal receiving base 18 engageable with the upper edges of the cylinder head and surrounding an open bottom. Inner and outer side walls 19, 20 respectively and end walls 22 extend upwardly from the base 18 and connect at their upper edges with a top wall 23 to provide an open bottomed enclosure for the compartment 16.

The outer surface of the top wall 23 is preferably provided with longitudinal appearance grooves 24. One or more bosses 26 are also provided through which bolts 27 or other suitable fasteners extend for retaining the valve cover on the cylinder head. Because of the angular disposition of the cylinder bank 12, the top wall 23 of the valve cover is preferably also disposed at a substantial angle from the horizontal with the inner edge of the top wall, adjacent side wall 19, being at a substantially higher position than the outer edge adjacent side wall 20 so that the top wall is inclined downwardly toward its outer edge.

At a suitable location on the top wall, wherein there is an adequate open space in the compartment underneath, there is provided an oil filler opening 28. Opening 28 may be of any suitable configuration but, in the present instance, is generally rectangular having longer sides extending longitudinally of the valve cover and shorter sides extending laterally thereof. The opening is provided with rounded corners 30 joining the longer and shorter sides.

Surrounding the opening 28 and defining its periphery, the valve cover is provided with an upturned lip 31 which extends upwardly from the top wall 23 to a point slightly above the upper surface of the wall, terminating in an upwardly facing peripheral surface 32 which defines a sealing surface. Outwardly of the rounded corners 30 of the opening and its adjacent peripheral lip 31, the top wall 23 is provided with four inwardly depending bosses 34 in which are formed threaded fastener receiving openings 35 extending downwardly from the outer surface of the top wall.

Mounted on the top wall above and surrounding the lip 31 and opening 28 is a filler cap assembly, generally indicated by numeral 36. Assembly 36 includes a generally flat rectangular sheet metal base 38, a rectangular cast aluminum cap 39 hingedly connected with the base and carrying a separate seal 40 and an integral pouring trough or funnel 42 formed in accordance with the invention, and a spring clip or latch 43 connected with the base and engageable to retain the cover in closed position when desired.

The base 38 is preferably formed as a sheet metal number but could be made of plastic or other material and constructed in another fashion if desired. Base 38 includes a flat body 44 that lies, when installed, against the upper surface of the top wall. The base has an elongated central opening 46 through which the valve cover upstanding lip 31 extends above the level of the flat body 44. Four screws 47 extend through openings, not shown, near the corners of the flat body and are received in the threaded openings 35 to retain the base in position on the valve cover top wall. At its outer edge, the base is provided with a curled-over hinge portion 48 in which a hinge pin 50 is received. The longitudinal sides of the base are turned upwardly to form stiffening rails 51, 52. A slot 54 extends through the flat body 44 between the opening 46 and the inner edge, opposite the hinge.

The cap 39 may be formed by any suitable method and material and, in the present instance, is preferably cast of aluminum or an alloy thereof. The cap structure includes a rectangular top portion 55 of a width and length similar to that of the sheet metal body and adapted to cover the body when closed. A pair of hinge portions 56 depend from under the top portion at either end of the longer edges thereof and are connected by the hinge pin 50 with the hinge portion 48 of the body for permitting pivotal motion of the cap into closed and opened positions. The edge 58 of the cap adjacent to the hinge portions 56 is configured to engage the top wall of the valve cover when the cap has been opened to a suitable angle past 90° so as to properly position the cap for adding oil through the filler opening 30.

Centrally disposed below the cap's top portion 55 and integral therewith is a seal retaining protrusion 59 having a size about or slightly less than that of the filler opening 30 and a periphery with a slight reverse angle on which the seal 40, a resilient O-ring, is retained. The protrusion 59 positions the seal 40 so that when the cap is closed the seal engages the peripheral sealing surface 32 of the valve cover lip 31 to close and seal the filler opening.

The spring clip 43 has at one end a U-shaped retaining portion 62 that is secured on the inner edge of the base 38 and held in place by engagement with the slot 54. At its other end, clip 43 has a latch portion 63 configured to engage a projection 64 on the inner edge of the cap top portion so as to retain the cap in closed position with the O-ring seal partially compressed. Release of the spring clip latch portion 63 allows the seal to expand and urge the cap upwardly into a partially open position to facilitate manual full opening of the cap.

In order to minimize the possibility of pouring or dripping oil on the cap hinge portion or the edge outside the seal from which it might run onto the top of the valve cover, the cap is provided with the previously mentioned pouring trough or funnel 42. Trough 42 is integrally cast as a portion of the cap, although it could be separately attached, and extends from the inner side of the protrusion 59 into and through the filler opening 30 into the oil containing compartment 16 when the cap is in the closed position. The pouring trough has a relatively wide bottom portion 66 with a pair of oppositely disposed sides 67 that extend outwardly from the bottom of the seal retaining protrusion and under one edge of the lip 31 to a point under the top wall 23 of the valve cover opposite the location of the cap hinge when the cap is in the closed position.

Figure 4:
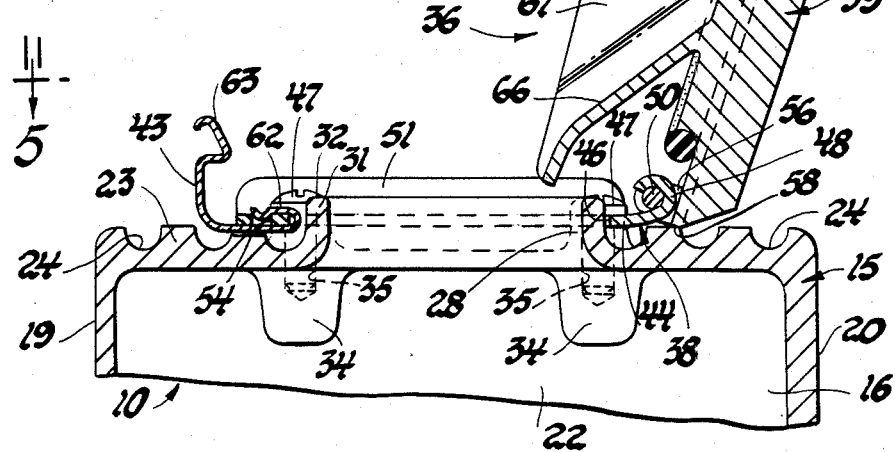
FIG. 4 is a view similar to FIG. 3 but showing the filler cap in an open position.
Figure 5:
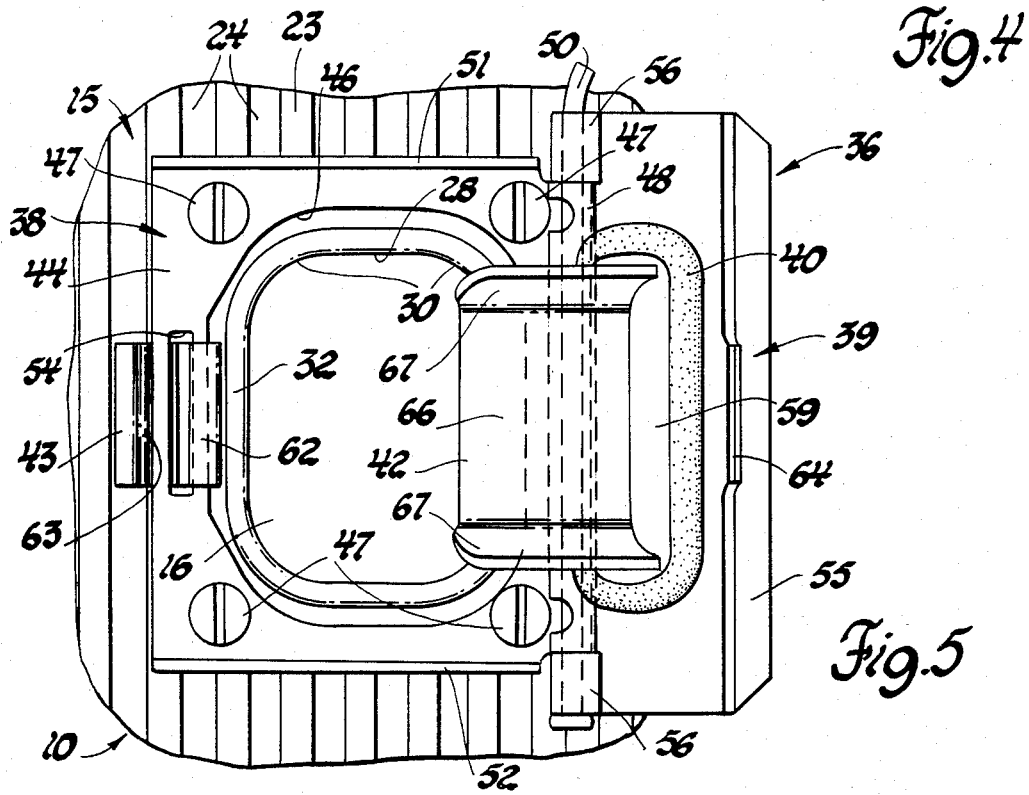
FIG. 5 is a top view showing the open filler cap arrangement as seen from the plane indicated by the line 5—5 of FIG. 4.

The trough 42 is so configured that upon opening the cap to the fully opened position shown in FIG. 4, the trough bottom and sides will extend outwardly from the seal protrusion, over the hinge and the adjacent seal portion of the filler opening to a point above the edge of the filler opening in the installed position of the engine. The width of the trough and its edge portions is nearly as wide as the longitudinal length of the seal retaining protrusion 59. Thus, oil poured or dripped on the trough, or the lower (inner) face of the seal retaining projection 59, will be prevented from dripping on the hinge or adjacent portions of the cap and valve cover and wall, instead, be carried by the trough over the hinge to a position above the edge of the filler opening from which it will drain through the opening and into the compartment 16.

Obviously, the design of the trough may be varied to suit the installation including the size and shape of the filler opening and the associated valve cover or other container on which the cap is disposed. The configuration must be such that the trough will carry oil to a point above the filler opening in the wide open position of the cap and still be capable of passing through the filler opening, when the cap is closed, for storage of the trough portion within the compartment 16.

With these constraints, it is apparent that numerous locations and configurations of cap filler and trough elements are possible for use on walls of a container which vary in position from horizontal to vertical and beyond. Thus, it is intended that the scope of the invention include the various arrangements which are possible in addition to that illustrated herein. In the present case the filler is located with the hinged side of the cap on the lower side of the angularly sloping top wall of a valve cover, which presently appears to be the preferable arrangement. However, it would also be possible to install the cap in the reverse direction with the hinge along the upper side of the sloping wall, or in any one of numerous other positions, if desired.

In operation, the cap is closed by pressing on the top portion 55 to compress the seal 40 against surface 32 until the projection 64 is engaged and retained by the latch portion 63 of the spring clip 43. In the closed position, shown in FIG. 3, the cap seals the filler opening against the loss of vapor or oil therethrough.

To open the cap, the latch portion 63 of the spring clip is released, allowing the seal to expand and force the cap to a partially open position from which it may be manually moved around its hinge to the fully open position shown in FIG. 4. In this position, oil may be poured into the filler opening 30 from an open can or through a spout, for example of the type commonly fitted into an oil can, which may be placed within the opening. During the filling operation, if any oil is poured or drips upon the inner surface of the central seal retaining protrusion 59 or on the pouring trough 42, this oil will be carried by the trough over the lower edge of the filler opening and above the opening, from which position it will be carried by gravity through the opening and into the compartment 16.

From the foregoing it should be apparent that the present invention provides a clean appearing oil filler and cap arrangement in which the nondetachable cap includes oil trough means for minimizing problems from the spillage of oil during filling. In addition, the construction involves a relatively small number of simple pieces which can be economically manufactured and easily assembled to provide the desired functions.

While the invention has been described by reference to a particular embodiment chosen for purposes of illustration, it is intended that the invention not be limited to the described embodiment but that it include the various changes which might be made within the spirit and scope of the inventive concepts described as defined by the language of the following claims.

The embodiments of the invention in which an exclusive property or privilege is claimed are defined as follows:

1. Combined, closure and filler means for a liquid container, said means comprising
   a wall of said container having a filler opening to the interior thereof and a peripheral surface surrounding said opening
   a cap secured to the exterior of said wall by hinge means, said cap being pivotable on said hinge means to move an inner side of the cap into and out of engagement with said peripheral surface to respectively close and open said filler opening, said cap having an open position wherein said inner side is spaced from said opening,
   a pour trough extending from said cap inner side into said opening when the cap is closed, said trough having spaced sides rising from a connecting bottom when the cap is open and extending from the cap inner side downwardly to a portion above the interior of said opening whereby, when the cap is open, liquid poured against said trough will be carried downward into said opening and, when the cap is closed, said trough will be stored within the closed container.

2. An engine oil filler and cap comprising
   means defining an exterior wall of an oil containing chamber of such engine, said wall having an oil fill opening therethrough with a sealing surface peripherally surrounding said opening and said wall having a side portion extending in generally planar relation with the peripheral surface outward of one side of the peripheral surface,
   a filler cap hinged to said exterior wall along said side portion thereof and pivotable between a closed position generally parallel with said wall and covering said opening and an open position extending at an angle with said wall and permitting access to said opening to pour oil therethrough into said chamber, and
   a pouring trough extending from an inner side of said cap, said trough extending through said opening and behind said wall side portion when the cap is in the closed position, and said trough having spaced sides rising from a connecting bottom extending above said cap and sloping downwardly over said peripheral surface and above said opening when the cap is in the open position, whereby oil poured on said trough is prevented from contacting the main cap surface and is directed by said trough into said opening.

3. An engine oil filler and cap comprising
   means defining an exterior wall of an oil containing chamber of such engine, said wall having an oil fill opening therethrough with a sealing surface peripherally surrounding said opening and said wall having a side portion extending in generally planar relation with the peripheral surface outward of one side of the peripheral surface,
   a filler cap hinged to said exterior wall along said side portion thereof and pivotable between a closed position generally parallel with said wall and covering said opening and an open position extending at an angle with said wall and permitting access to said opening to pour oil therethrough into said chamber,
   a continuous resilient seal carried on the interior of said cap and sealingly engageable with said peripheral wall surface when said cap is in the closed position,
   latch means operative between an edge of said cap and said wall at a location distal from the cap hinged portion, said latch means being engageable to maintain said seal compressed to seal the opening along the peripheral surface when the cap is closed and said latch means being releasable to permit the seal to urge the cap in an opening direction when released to facilitate opening of the cap and permit oil filling, and
   a pouring trough extending from an inner side of said cap within said seal, said trough extending through said opening and behind said wall side portion when the cap is in the closed position, and said trough extending above said cap and sloping downwardly over said peripheral surface and above said opening when the cap is in the open position, whereby oil poured on said trough is prevented from contacting the main cap surface and is directed by said trough into said opening.

4. A combination as defined in claim 1 wherein said cap in its open position faces at least partially upward.

5. A combination as in claim 4 wherein said hinge means lies along one edge of said opening and said pour trough extends over said hinge means when the cap is open with said portion above the interior of said opening lying near to said one edge adjacent said hinge.

* * * * *